United States Patent Office 2,777,857
Patented Jan. 15, 1957

2,777,857
METHYLENE-1-BIS-4,5-DIHYDROXYTETRAHYDRO-3-HYDROXYMETHYLIMIDAZOLS

Josef König, Krefeld-Linn, Germany, assignor to Phrix-Werke Aktiengesellschaft, Hamburg, Germany, a corporation of Germany No Drawing. Application December 17, 1954, Serial No. 476,085

Claims priority, application Germany December 31, 1953

6 Claims. (Cl. 260—309.7)

This invention relates to novel methylene-1-bis-4,5-dihydroxytetrahydro-3-hydroxymethylimidazols.

The invention more particularly relates to and has as its object the production of novel methylene-1-bis-4,5-dihydroxytetrahydro-3-hydroxymethylimidazols in which each imidazol ring is substituted in the 2-position with oxygen or sulfur and which have been found to constitute excellent impregnation agents for textiles and like materials for increasing the crease and abrasion resistance thereof. The novel compounds in accordance with the invention have the following formula:

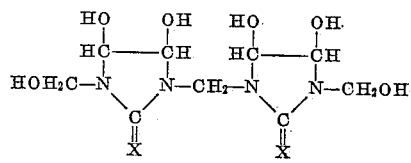

in which X is sulfur or oxygen.

When X is oxygen, the compound may be designated methylene - 1 - bis - 4,5 - dihydroxytetrahydro - 3 - hydroxymethylimidazolone-2, and when X is sulfur, the compound may be designated methylene-1-bis-4,5-dihydroxytetrahydro-3-hydroxymethylimidazol thione-2.

The novel compound in accordance with the invention may be obtained by reacting 1 mol of urea or thiourea with about 1.5 mols of formaldehyde in an aqueous solution having a neutral to slightly alkaline reaction, thus forming a methylol urea or thiourea. The reaction is effected without the addition of heat, preferably at around normal temperature.

The methylol urea or thiourea formed is then reacted with a mol of glyoxal. The reaction proceeds exothermically, and, after the heat of reaction has dissipated, there is first obtained a compound in which the ratio of aldehyde to nitrogen is about 3.63:1. In this connection there appears to be present a hydroxy methylated glyoxal monourea. After this compound stands for a short period of time, very surprisingly and unexpectedly a rearrangement occurs with the formation of a compound in the solution which has a ratio of aldehyde to nitrogen of 3.1:1. Since no lost weight can be noted in this connection, this rearrangement can only be explained by the fact that two imidazol rings of the glyoxal join with a methylene-bridge connecting the nitrogen atoms of the ring system forming a novel bis compound with the splitting off of water. This reaction, starting, for example, with methylol urea, may be represented as follows:

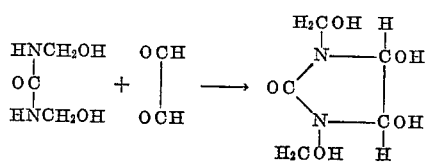

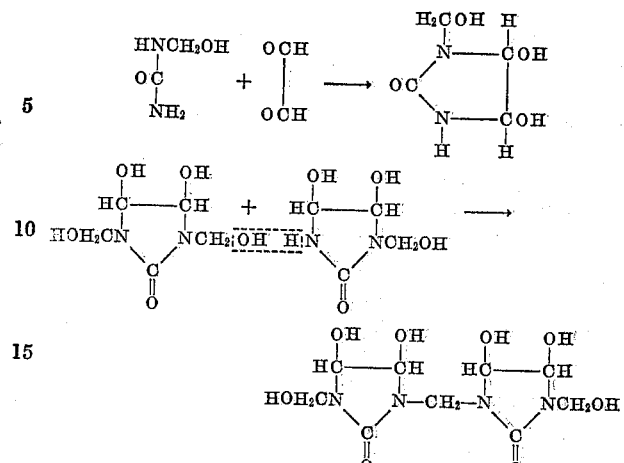

If the reaction is effected starting with thiourea in place of urea to form the methylol thiourea, the action proceeds in identical manner with the formation of a corresponding imidazol thione compound instead of the imidazolone ring.

While it has already been proposed to use a reaction product of methylol urea with glyoxal as a textile impregnation agent, the methylol urea glyoxal was always effected in an acid reaction, so that at most the reaction would proceed with the formation of acetylenediurea, which would possibly be substituted with some hydroxy methyl groups, and thus, without any formation of the novel bis compound in accordance with the invention.

The novel bis compound obtained in accordance with the invention is only stable in aqueous solution and is highly effective for the finishing of textiles, papers, and the like, in which connection, depending on its use, either a high abrasion resistance or a high resistance to creasing is imparted to the material treated.

The impregnation with the novel bis compound is effected in the conventional manner for effecting the impregnation of textiles with the impregnating agents. Thus, for example, the fabric to be impregnated may be immersed in an aqueous solution of the compound, which, for example, has been adjusted to a slightly acid pH by the addition, for example, of boric acid. After the impregnation, the textile material is dried in the conventional manner.

The following examples are given by way of illustration and not limitation:

Example 1

1 mol urea is reacted with 1.5 mol formaldehyde in an aqueous solution of a pH of 7.5 to 8 in an exothermic reaction. As soon as the free aldehyde amounts to less than 10%, 1 mol neutralized glyoxal in aqueous solution is added. After the reaction mixture which is heated by the heat of reaction cools off, there is obtained a product which no longer has any free aldehyde and in which the ratio of aldehyde to nitrogen is 3.63:1. After about 3 hours a rearrangement takes place and there is obtained a new product in which the ratio of aldehyde to nitrogen is 3.1:1. No loss of weight is noted in this connection. This compound may be designated methylene-1-bis-4,5 - dihydroxytetrahydro - 3 - hydroxymethyl imidazolone-2.

The particularly favorable action of the new compound on the resistance to abrasion of the textiles treated therewith can be noted from the following comparative tests:

A spun rayon fabric is impregnated in a solution, containing 200 grams of the new compound per liter, which has been brought to a pH of 5.3 by the addition of 10 grams boric acid per liter; after the excess liquid is squeezed off, the fabric is dried at 90 to 100° C. The resistance to abrasion of the fabric is 2700 revolutions under a 400 gram load of a standard abrasion-resistance tester.

A comparative piece which is impregnated with water and dried under the same conditions shows a resistance to abrasion of 1600 revolutions in the same abrasion strength test.

The unimpregnated piece taken directly from the loom shows an abrasion resistance of 1507 revolutions.

The production of the methylol urea or methylol thiourea respectively by reaction with formaldehyde may be effected in an alkaline solution with a pH of 7 to 11, with preference of 7.5 to 8.0.

The reaction temperature may be with preference between 20 and 30° C. At this temperature the disproportionation of the aldehyde into alcohol and acid which may be initiated by the alkali present in the solution is negligible for practical purposes. To prevent a further disproportionation of the aldehyde the reaction solution may be cooled, e. g. to 10° C. On the other hand, higher temperatures, e. g. about 60° C., may be chosen to abbreviate the time necessary for carrying through the reaction, though the evaporation of the formaldehyde, however, may be essential at this temperature.

The reaction of the methylol urea, respect. the methylol thiourea with glyoxal may be effected under same conditions as reported for the reaction of urea respect. thiourea with formaldehyde. A stronger alkaline reaction ought to be prevented, i. e. the pH of the solution may be not higher than 9. Lower temperatures are more favorable for the reaction and it may therefore be advisable to carry through the reaction under slight cooling, e. g. at temperatures about 10° C. The temperature may, however, if this seems to be advisable out of technical reasons, be risen to 60° C.

The reaction of the methylol urea with glyoxal may be carried through in a solution with slightly neutral pH, because the disproportionation of the aldehyde is negligible under such conditions as above mentioned. Simultaneously these conditions are very favorable for the quick formation of the methylene group, i. e. for the formation of the methylene bridge between the two imidazolone rings. The following example may illustrate the production of the new compound using thiourea in place of urea.

*Example 2*

1 mole thiourea will be reacted with 1.55 mole formaldehyde in aqueous solution under addition of such an amount of alkali that the pH of the solution will be adjusted at 8.5. It is necessary to initiate the reaction by heating the mass up to 25° C., whereon the reaction will proceed exothermically. As soon as an analysis—usually after about 60 minutes—shows that the free aldehyde in the solution amounts to less than 8%, 1 mole of exactly neutralized glyoxal (30% solution) will be added and the pH adjusted at 7.5 to 8.0. This second reaction too, proceeds exothermically, i. e. the temperature of the mass will rise spontaneously to about 45° C. and then decrease quickly. During the first reaction of the thiourea with formaldehyde as well as during the second reaction of the methylol thiourea with glyoxal it is necessary to stir the solution well.

The product obtained in the before mentioned manner may be added in an amount of 250 g./1000 ccm. to an impregnating solution the pH of which will be adjusted with conc. muriatic acid at 3.5. A spun rayon fabric impregnated with said solution shows good crease resistance and smooth touch.

I claim:

1. As a new chemical compound, a methylene-1-bis-4,5-dihydroxy-tetrahydro-3-hydroxymethylimidazol compound of the formula

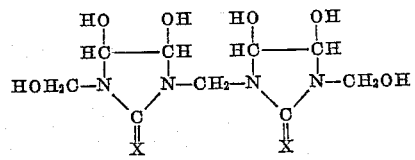

wherein X is a member of the group consisting of oxygen and sulfur.

2. As a new chemical compound, methylene-1-bis-4,5-dihydroxytetrahydro-3-hydroxymethylimidazolone-2.

3. As a new chemical compound methylene-1-bis-4,5-dihydroxytetrahydro-3-hydroxymethylimidazol thione-2.

4. Process for the preparation of 2-substituted methylene - 1 - bis - 4,5-dihydroxytetrahydro-3-hydroxymethylimidazol, which comprises contacting a member selected from the group consisting of urea and thiourea with formaldehyde, and then contacting the reaction product of said group member and said formaldehyde with glyoxal in a molecular ratio of at least 1.5:5 in a neutral to weakly alkaline solution, and recovering the bis compound formed.

5. Process for the preparation of 2-substituted methylene - 1 - bis - 4,5-dihydroxytetrahydro-3-hydroxymethylimidazol, which comprises contacting a member selected from the group consisting of urea and thiourea with formaldehyde in a molar ratio of 1:1.5 in an aqueous solution having a neutral to weakly alkaline reaction, at the termination of reaction between said group member and said formaldehyde adding glyoxal in amount of 1 mol for each mol of said group member, and recovering the bis compound formed.

6. Process according to claim 5, in which said contacting of said group member and said formaldehyde is effected at normal temperature.

References Cited in the file of this patent

UNITED STATES PATENTS 2,574,114  Lehmann et al. _____ Nov. 6, 1951
2,613,210  Hurwitz et al. _____ Oct. 7, 1952

OTHER REFERENCES

Winheim et al.: Chem. Abst., vol. 44, col. 9177 (1950).
Behrend et al.: Liebigs Ann., vol. 339, pp. 1–13 (1905).